(12) United States Patent
Aeschlimann et al.

(10) Patent No.: US 10,654,139 B2
(45) Date of Patent: May 19, 2020

(54) DEVICE WITH A DISPLACEABLE CARRIAGE AND A LINEAR GUIDE

(75) Inventors: Adrian Aeschlimann, Hünibach (CH);
Andreas Senn, Lyss (CH); Reto Zwahlen, Steffisburg (CH)

(73) Assignee: FRITZ STUDER AG (CH)

( * ) Notice: Subject to any disclaimer, the term of this patent is extended or adjusted under 35 U.S.C. 154(b) by 912 days.

(21) Appl. No.: 13/352,782

(22) Filed: Jan. 18, 2012

(65) Prior Publication Data

US 2012/0190275 A1  Jul. 26, 2012

(30) Foreign Application Priority Data

Jan. 21, 2011   (EP) ..................................... 11151648

(51) Int. Cl.
| | | |
|---|---|---|
| B23Q 1/38 | (2006.01) | |
| F16C 29/00 | (2006.01) | |
| B23Q 1/58 | (2006.01) | |
| F16C 29/02 | (2006.01) | |

(52) U.S. Cl.
CPC ................. *B23Q 1/38* (2013.01); *B23Q 1/58* (2013.01); *F16C 29/005* (2013.01); *F16C 29/025* (2013.01); *F16C 2322/39* (2013.01)

(58) Field of Classification Search
CPC . B23Q 1/38; B23Q 1/58; F16C 29/005; F16C 29/025; F16C 32/06; F16C 32/064; F16C 32/0633; F16C 32/0651; F16C 32/0655; F16C 32/0659; F16C 32/0674
USPC ....... 451/11, 24, 150–154; 384/7, 12, 13, 26
See application file for complete search history.

(56) References Cited

U.S. PATENT DOCUMENTS

| | | | | |
|---|---|---|---|---|
| 2,869,933 | A | * | 1/1959 | Bissinger ................ B23F 23/00 384/100 |
| 3,151,015 | A | | 9/1964 | Griffith |
| 3,436,129 | A | * | 4/1969 | James ............................ 384/36 |

(Continued)

FOREIGN PATENT DOCUMENTS

| | | |
|---|---|---|
| CH | 675 220 A5 | 9/1990 |
| CN | 101412209 | 4/2009 |

(Continued)

OTHER PUBLICATIONS

European Search Report dated Jun. 20, 2011, issued in corresponding European priority patent application No. EP 11 15 1648.

(Continued)

*Primary Examiner* — Monica S Carter
*Assistant Examiner* — Marcel T Dion
(74) *Attorney, Agent, or Firm* — Ostrolenk Faber LLP

(57) ABSTRACT

A displaceable carriage (10) and a linear guide for guiding the carriage, which includes a first guide path slideway (13, 31) and a second guide path slideway (32). To form the first slideway (13, 31), the carriage (10) includes at least one pocket (13), which slides along the first guide path part (31) and can hold lubricant under pressure to create a relieving force on the carriage (10). The second guide path part (32) includes an island-shaped surface to create a frictional force on the carriage (10). A pressure medium held in the at least one pocket (13, 14, 15) creates the relieving force, whereby the first slideway (13, 31) relieves the load on the second slideway (11*a*, 12*a*, 12*b*, 32).

21 Claims, 4 Drawing Sheets

(56) References Cited

U.S. PATENT DOCUMENTS

| | | | |
|---|---|---|---|
| 3,781,069 A * | 12/1973 | Gluchowicz | F16C 32/0659 384/110 |
| 4,129,291 A * | 12/1978 | Kato et al. | 269/73 |
| 4,272,216 A | 6/1981 | Osburn | |
| 4,285,551 A * | 8/1981 | Suzuki | B24B 41/007 384/100 |
| 4,351,574 A * | 9/1982 | Furukawa et al. | 384/8 |
| 4,368,930 A * | 1/1983 | Duchaine | F16C 32/0666 384/12 |
| 4,491,373 A * | 1/1985 | Sugi et al. | 384/13 |
| 4,523,410 A | 6/1985 | Yoshioka et al. | |
| 4,763,448 A * | 8/1988 | Yoshioka | B24B 5/18 451/14 |
| 4,865,465 A * | 9/1989 | Sugita | B23Q 1/38 384/12 |
| 5,462,362 A * | 10/1995 | Yuhta et al. | 384/13 |
| 6,749,378 B2 * | 6/2004 | Saito et al. | 409/235 |
| 7,785,009 B2 * | 8/2010 | Saito et al. | 384/12 |
| 8,288,676 B2 | 10/2012 | Shinjo | 219/78.01 |
| 2004/0094901 A1 * | 5/2004 | Gittler | F03B 11/006 277/408 |
| 2005/0013512 A1 * | 1/2005 | Saito | 384/12 |
| 2005/0147332 A1 * | 7/2005 | Kobayashi et al. | 384/12 |
| 2012/0213457 A1 * | 8/2012 | Schroeder | 384/41 |

FOREIGN PATENT DOCUMENTS

| | | |
|---|---|---|
| DE | 31 31 566 A1 | 6/1982 |
| EP | 0 536 494 A1 | 4/1993 |
| JP | S64-2838 | 1/1989 |
| JP | H01-87858 | 6/1989 |
| JP | H02-15837 | 1/1990 |

OTHER PUBLICATIONS

Office Action and Search Report dated Mar. 31, 2015 corresponding to the Chinese Patent Application No. 20121001755.8 in English.
Japanese Office Action, dated Oct. 28, 2015, issued in corresponding Japanese Patent Application No. 2012-009796. Includes English translation. Total 9 pages.

* cited by examiner

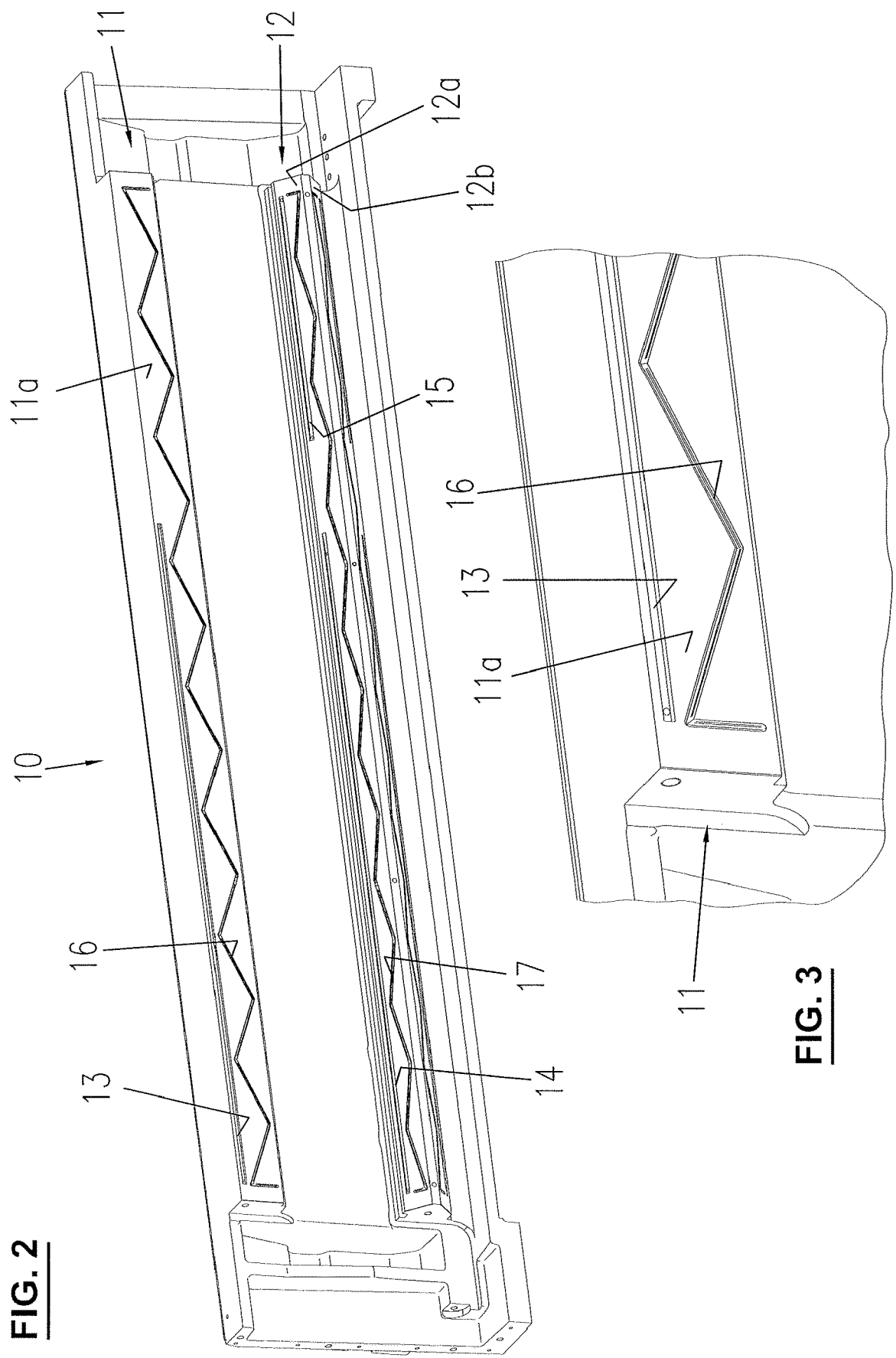

DEVICE WITH A DISPLACEABLE CARRIAGE AND A LINEAR GUIDE

FIELD OF THE INVENTION

The present invention relates to a device comprising a displaceable carriage and a linear guide.

BACKGROUND OF THE INVENTION

There are known linear guides which operate hydrostatically. Pockets that can hold a lubricant under pressure are provided for this purpose. It has been found that such guides are susceptible to interfering influences, so it becomes difficult to hold the carriage in a certain position. For example, if the carriage is used for machining a workpiece, even minor ground vibrations may make it difficult to hold the carriage in a certain position, which thereby impedes an accurate machining. Furthermore, the achievable path accuracy is restricted in the case of long guides.

DE 31 31 566 A1 describes a linear guide comprising a hydrodynamic guide rail and a hydrostatic guide rail which is arranged opposite the hydrodynamic guide rail and thus applies a load to it. The design of the guide rails is not explained in detail.

SUMMARY OF THE INVENTION

One object of the present invention is to create a device of the type mentioned in the introduction in which the carriage is precisely movable and positionable to an improved extent. This object is achieved by a device comprising a displaceable carriage with at least one pocket, in which lubricant can be held under pressure, and an island-shaped surface to produce a frictional force acting on the carriage. This makes it possible to provide a hydrodynamic slideway, for which the friction is adjustable through the hydrostatic relief. The carriage is precisely movable and positionable with this type of guide.

BRIEF DESCRIPTION OF THE DRAWINGS

The invention is explained in greater detail below on the basis of an exemplary embodiment with reference to the figures, in which

FIG. 2 shows a carriage of the device from FIG. 1 in a view from underneath;

FIG. 3 shows a detailed view from FIG. 2;

DETAILED DESCRIPTION OF THE PREFERRED EMBODIMENTS

Figure 1:
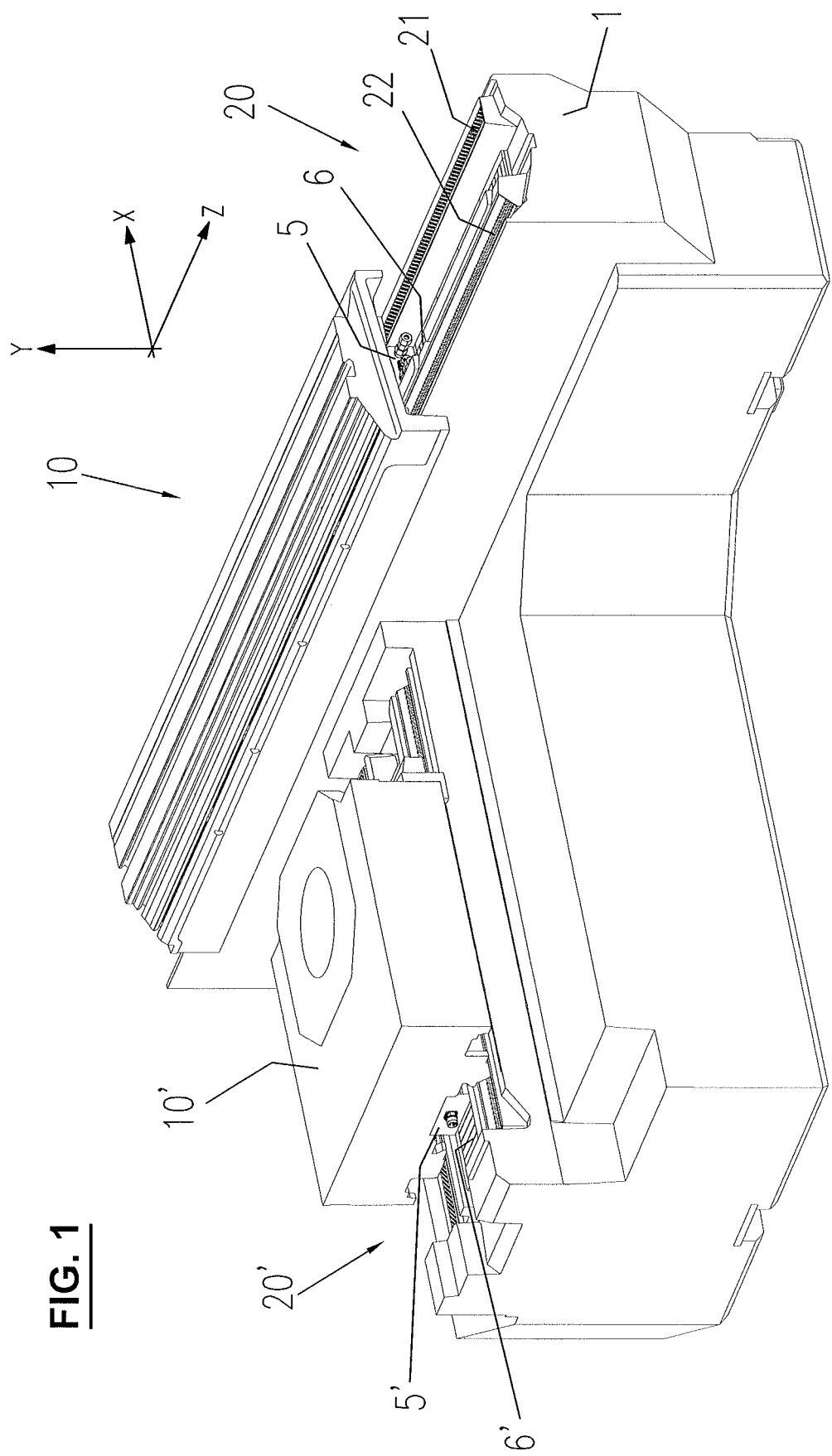
FIG. 1 shows a perspective view of a device according to the invention having two feed axes X and Z.

FIG. 1 shows a device having a machine bed 1, on which a carriage 10 is arranged. The carriage can travel in one axis, namely the Z axis here, its path of movement being defined by a linear guide 20. In the present example, the linear guide 20 is embodied as a guide freely supported, i.e., it is free of wrap-arounds, for example, in the form of a V-flat guide, as also shown in FIG. 2. Other guides are also conceivable, e.g., only a V guide or only a flat guide.

The linear guide 20 comprises two guide profiles 21 and 22, which extend in the direction of the axis Z of movement. The respective guide profile 21, 22 is embodied, for example, so that it is integrated into the machine bed or is attached to the machine bed in the form of a separate rail. A carriage drive 5, 6 for moving the carriage 10 is arranged between the guide profiles 21, 22. In the present example, the carriage drive 5, 6 is embodied in the form of a linear motor, which contains a primary part 5 mounted on the underside of the carriage 10 and containing electric windings, as well as a secondary part 6 extending between the guide profiles 21, 22 in the direction of the axis of travel Z and being provided with permanent magnets. A traveling field can be generated by supplying the windings in the primary part 5 with a suitable current, exerting a thrust from the primary part 5 on the secondary part 6 and thus inducing movement of the carriage 10. To effectively dissipate the heat generated by the linear motor 5, 6 during its operation, a cooling system with a circulating cooling fluid, which may be brought into contact with the primary part 5 and/or the secondary part 6, may be used.

Instead of a linear motor 5, 6, other drives are also conceivable for moving the carriage 10, for example, a rotary drive, e.g., one with a ball screw spindle.

FIG. 2 shows the underside of the carriage 10 without the primary part 5 of the carriage drive. The carriage 10 has two guide profiles 11 and 12, which protrude out of the underside of the carriage 10 and slide along the guide profiles 21 and 22 when traveling. The first guide profile 11 has a slide plane 11a in which recesses 13, 16 have been created (cf. also the detailed view in FIG. 3). The first recess 13 extends in the axis of travel Z and serves as a pocket to form a hydrostatically relieving slideway. The second recess 16 runs between the pocket 13 and the inside edge of the guide profile 11 in a zigzag pattern along the slide plane 11a. The second recess 16 serves as a lubrication groove to form a hydrodynamic slideway.

The second guide profile 12 has two slide planes 12a and 12b, which are arranged inclined at an angle according to the V shape of the guide profile 22 and are each provided with recesses 14, 15, 17 like the slide plane 11a. The recesses 14 and 15 formed in the slide plane 12a, 12b extend in the axis Z of travel, such that they are arranged in line, and serve to form hydrostatic pockets like the pocket 13 on the first guide profile 11. The recess 17 formed in the slide plane 12a, 12b has a zigzag-shaped course along the slide plane 12a, 12b and serves as a lubrication groove like the lubrication groove 16 on the first guide profile 11.

Figure 4:
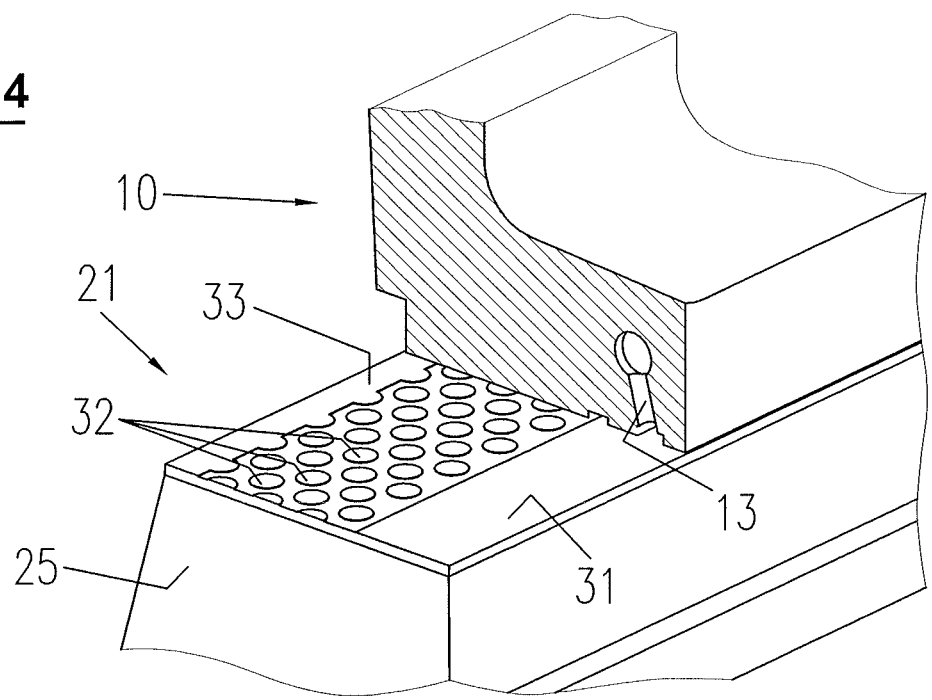
FIG. 4 shows a part of the linear guide from FIG. 1 in a perspective view, with the carriage being shown in a partial sectional view.

FIG. 4 shows a detailed view of the carriage 10 which rests on the guide profile 21 arranged on the stand 25. The profile 21 has a guide path running substantially horizontally and comprises a first guide path part 31, a second guide path part 32 and a third guide path part 33.

The guide path parts 31-33 are designed to be substantially flat and have a sliding path surface, which is structured in different ways.

Figure 5:
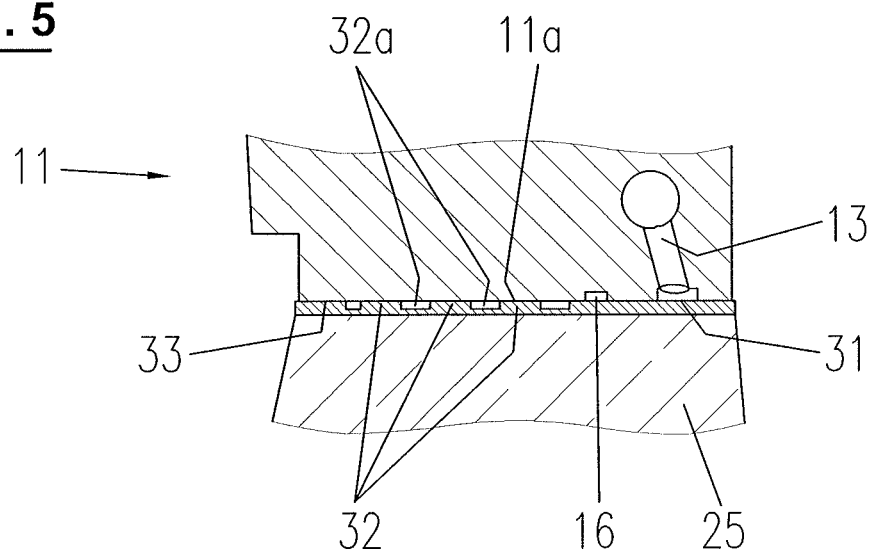
FIG. 5 shows the part of the linear guide from FIG. 4 in a sectional side view.

The first guide path part 31, which is designed to be closed and extends in an uninterrupted fashion along the edge of the stand 25, serves as the closure of the pocket 13 on the carriage 10, as also shown in FIG. 5. Lubricant can be directed into the pocket 13 through a feed line and suitable bores in carriage 10 and can be put under pressure there.

The second guide path part 32 is designed to be interrupted by the provision of islands. The islands 32 may also have a shape different than the nubs shown here. For example, it is conceivable that individual islands or all of the islands 32 may be connected to the first guide path part 31 and/or to the third guide path part 32. The islands 32 are surrounded by a recess 32a for receiving lubricant (cf. FIG. 5). The second guide path part 32 serves as a closure to the part of the slide plane 11a in which the lubrication groove 16 runs.

The third guide path part 33 is designed to be closed and extends in an uninterrupted manner along the edge of the stand 25. The two guide path parts 31 and 33 form a lateral closure so that lubricant cannot escape at the side.

The V-shaped guide profile 22 is designed according to the guide profile 21 shown in FIG. 4 in that the two flanks of the guide profile 22 each have two guide path parts in the manner of the guide path parts 31 and 33 and, arranged in between, a structured guide path part in the manner of the guide path part 32.

The guide path 31-33 is manufactured from a wear-resistant material such as plastic. The recesses 13-17 can be created at the time of manufacture of the carriage 10, for example, by milling and/or molding.

The functioning of the linear guide 20 described above will now be explained below on the basis of FIG. 5 and the schematic diagram in FIG. 6. Since the two guides 11, 21 and 12, 22 function in the same manner, for the sake of simplicity only the functioning of the one guide 11, 21 will be explained here.

A normal force Fn directed against the guide 11, 21 acts on the carriage 10. The force Fn is obtained from the weight force originating from the mass of the carriage 10 and from the load Q additionally acting on the carriage as well as from an additional preload. In the present example, this additional preload is created by the attractive force of the carriage drive 5, 6 designed as a linear motor. An additional preload may also be supplied by other means, for example, by providing additional hydrostatic pockets which act in the direction of the weight force.

During operation of the carriage 10 the pocket 13 is filled with a fluid lubricant, for example, a lubricating oil, which is put under pressure. This results in a relieving force Fe, which acts against the normal force Fn and relieves the load on the carriage 10. The surface pressure is thereby minimized. Pocket 13 and guide path part 31 thus form a hydrostatically relieved slideway. In this area of the guide, friction is created only in the lubricant when displacing the carriage 10. The corresponding frictional force Fr' is negligible, i.e., Fr'≈0.

Fluid lubricant is also added between the two guide path parts 31 and 33. The carriage 10 is in contact with the second guide path part 32 via the slide plane 11a. The distribution of the lubricant in the recess 32a of the guide path part 32 is supported by the lubrication groove 16 when displacing the carriage 10. On the whole, the slide plane 11a and the guide path part 32 form a hydrodynamic slideway. In this area of the guide, friction is created primarily between the surfaces 11a and 32, which are rigid. The corresponding frictional force Fr is given by the difference between the normal force Fn and the relieving force Fe: Fr=μ·(Fn−Fe), where μ is the coefficient of friction.

On the whole, a total frictional force F of F=Fr'+Fr≈μ (Fn−Fe) acts on the carriage 10 because of the hydrostatic and hydrodynamically supported slideway 11a, 13, 31, 33.

To ensure accurate ventilation of the pockets 13-15, it is conceivable to provide nozzles and/or throttles on the carriage 10 to permit a continuous flow of lubricant through the pockets 13-15. Therefore, air which is in the pockets 13-15 due to a longer standing time, for example, can be drawn off. The nozzles and/or throttles are to be selected, so that the flow is as small as possible and so that a sufficiently great lubricant pressure can be built up in the pockets 13-15.

Figure 6:
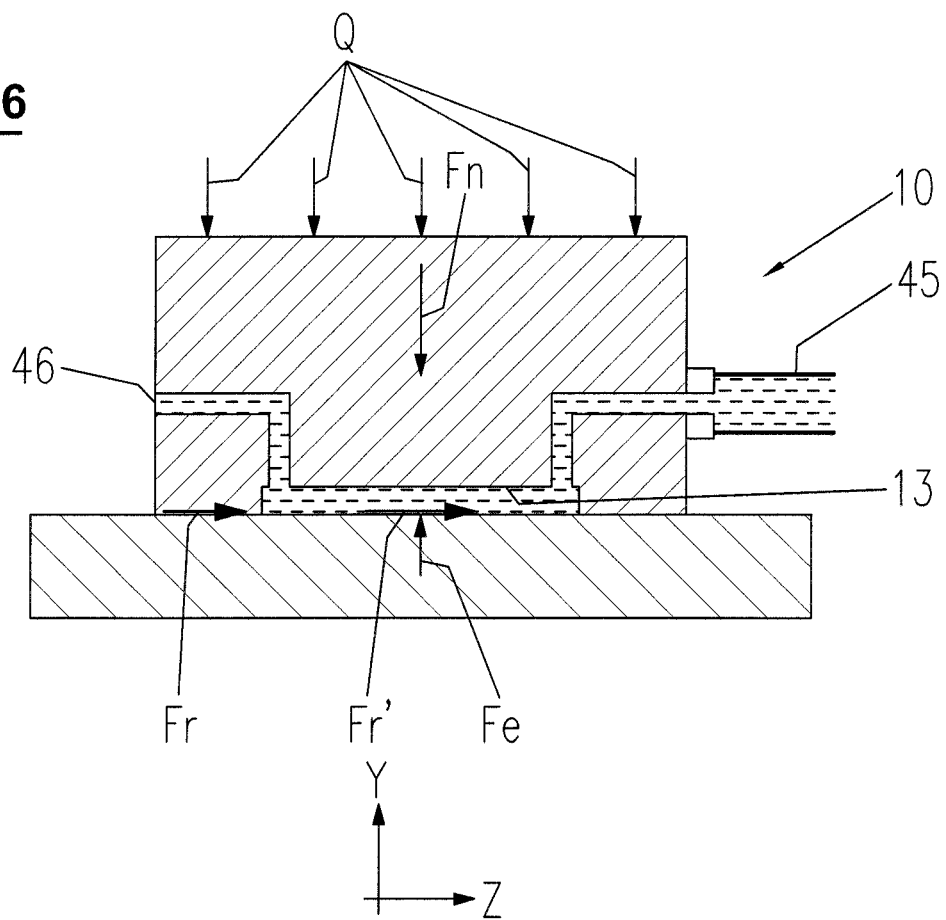
FIG. 6 shows a schematic diagram of the device according to FIG. 1 in a sectional side view.

FIG. 6 shows schematically the pocket 13, which is connected fluidically to a feed line 45 on the one hand and to a drain 46 on the other hand. The feed line 45 is connected to external means for generating the lubricant pressure.

In summary it can be concluded that the linear guide 20 described here functions according to the principle of hydrodynamic guidance with hydrostatic relief. Due to the pressure acting on the relief pockets 13-15, the normal force Fn and thus the frictional force Fr between the carriage 10 and the guide path part 32 are reduced.

The linear guide 20 can be designed as a static system so that the relief remains constant once it has been set. The size of the relieving force Fe is designed according to the minimal load Q which is provided so that the guide qualities and a desired measure of stiffness are preserved. If the guide 20 is designed as a guide freely supported as in the present example, then it is necessary to ensure, among other things, that the carriage 10 still rests securely on the guide profiles 21, 22, even at the minimal load Q.

The measure of relief can be defined by various parameters such as the number, length and width of the pockets 13-15 and their position on the carriage 10 as well as the lubricant pressure in the pockets 13-15. Regions may be relieved in different ways depending on the choice of these parameters. This is necessary, for example, when the load profile Q is asymmetrical which is in contrast with the case shown in FIG. 6 where the arrows Q indicate a constant load profile.

Providing the linear guide 20 described here has the advantage that, among other things, a carriage 10 can be moved precisely to a certain position and held there. It has been ascertained that the frictional force Fr generated on the basis of the linear guide 20 has a damping effect on interfering factors. These may be caused internally, e.g., by a change in the load on the carriage 10 over time, or externally, e.g., due to ground vibrations. Because of the damping, these interfering factors have no effect on a change in position of the carriage 10. It is therefore simpler to regulate the device in such a way that the carriage 10 is held in a certain position.

Providing a linear guide as a combination of a hydrodynamic guide and a hydrostatic guide also has the advantage that the linear guide has an improved stiffness and an improved path precision, in particular when the guide length is great.

If a linear guide 5, 6 is provided as a carriage drive, then a precise distance between the two parts 5 and 6 is ensured by the linear guide 20 and a precise positioning of the carriage 10 is possible. In addition high speeds and accelerations can be generated by means of the linear motor 5, 6 and thus rapid movements of the carriage 10 are possible.

The linear guide 20 can be used in a variety of ways, in particular on machines which are designed for machining workpieces, e.g., by grinding. In the example according to FIG. 1 a workpiece holder which has a workpiece headstock and a tailstock, for example, can be mounted on the carriage 10, for example. FIG. 1 shows another carriage 10', which can travel in the X axis, wherein the guide 20' is designed like the linear guide 20. For example, a linear motor 5', 6', which is designed like the linear motor 5, 6 is used for the drive. A rotatable grinding disk can be mounted on the second carriage 10', for example. The device according to FIG. 1 is thus suitable for use on a grinding machine, in particular a cylindrical grinding machine, in order to be able to machine workpieces accurately.

Numerous modifications are accessible to those skilled in the art from the preceding description without going beyond the scope of the invention, which is defined by the claims.

For example, the definite geometric embodiment of the linear guide 20, 20' can be adjusted. For example, instead of the V-flat guide shown here, the guide may also be embodied as a pure V guide, a pure flat guide or also as a guide having a different geometric shape.

Figure 7:
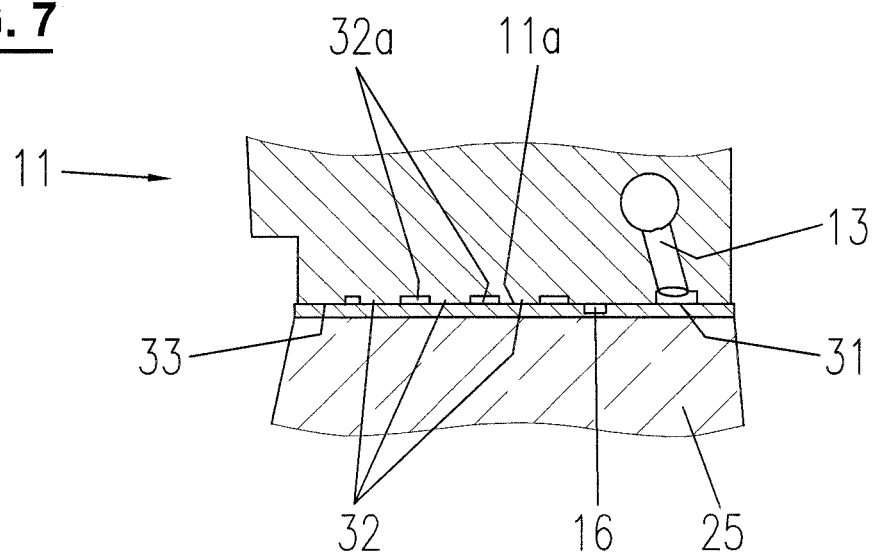
FIG. 7 shows another embodiment of the linear guide, in a sectional side view.

In another embodiment, shown in FIG. 7, the island-shaped guide path part 32 is provided on the carriage 10 and the area between the two guide path parts 31 and 33 takes the form of the slide plane 11a. A lubrication groove in the form of the lubrication groove 16 is provided in this slide plane.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A device comprising:
  a carriage displaceable along an axis of travel, and
  a linear guide for guiding said carriage, said linear guide comprising a first guide path part to form a first slideway and a second guide path part to form a second slideway, wherein
  said carriage includes at least one elongated linear pocket to form said first slideway, said at least one pocket being configured to slide along said first guide path part and being formed as a groove extending along the axis of travel from a first end to a second end, the second end being spaced away from the first end,
  the groove including a first wall and a second wall opposed to the first wall, with a continuous open space defined between the first wall and the second wall and extending along their entire length, each of the first and second ends being defined by a third wall arranged transversally to the first and second walls, the first and second walls ending at the third wall,
  wherein said at least one pocket is configured to hold a liquid lubricant under pressure in said at least one pocket to create a relieving force acting on said carriage, and
  wherein said second guide path part comprises an island-shaped surface which creates a frictional force acting on said carriage and is arranged in such a way that, when said liquid lubricant is held in said at least one pocket to create said relieving force, said first slideway relieves the load on said second slideway,
  wherein a space between said at least one pocket and said first guide path part is unsealed, to enable a flow of liquid lubricant through said space and out of said at least one pocket.

2. The device according to claim 1, further comprising a preloading arrangement, which is configured to produce a preload on the linear guide in addition to the weight force created by said carriage.

3. The device according to claim 1, further comprising a linear motor as a drive for displacing the carriage.

4. The device according to claim 1, wherein the second guide path part runs along the first guide path part, which includes a closed surface.

5. The device according to claim 4, wherein the second guide path part runs along a third guide path part, which includes a closed surface.

6. The device according to claim 1, wherein the linear guide comprises a slide plane to form the second slideway, the slide plane being arranged opposite the second guide path part.

7. The device according to claim 6, wherein the slide plane further comprises at least one lubrication groove.

8. The device according to claim 7, wherein the at least one lubrication groove runs in a zigzag pattern along the slide plane.

9. The device according to claim 1, wherein the first guide path part and the second guide path part are arranged substantially parallel to one another and in substantially the same plane.

10. The device according to claim 1, wherein the first guide path part and the second guide path part are movable relative to one another.

11. The device according to claim 1, wherein the island-shaped surface is designed in the form of nubs.

12. The device according to claim 1, wherein the carriage comprises a vent hole, out of which said liquid lubricant can escape from the at least one pocket.

13. The device according to claim 1, wherein the carriage comprises two guide profiles, each of which includes at least one pocket.

14. The device according to claim 1, wherein the carriage can travel in the horizontal.

15. The device according to claim 1, wherein the linear guide is a guide freely supported.

16. The device according to claim 1, wherein the linear guide comprises two guide profiles, each of which is designed as a flat guide or as a V guide.

17. A grinding machine, comprising a device according to claim 1.

18. The device according to claim 15, wherein the linear guide is free of surrounding surfaces.

19. The device according to claim 1, wherein the carriage comprises at least one of a nozzle and a throttle to permit a flow of the liquid lubricant through the at least one pocket.

20. The device of claim 1, further comprising a drain for collecting liquid lubricant flowed out of said at least one pocket.

21. Method for machining a workpiece, comprising the steps of
  providing a device comprising a displaceable carriage which is displaceable along an axis of travel, and a linear guide for guiding said carriage, said linear guide comprising a first guide path part to form a first slideway and a second guide path part to form a second slideway,
  wherein said carriage includes at least one elongated linear pocket to form said first slideway, said at least one pocket being configured to slide along said first guide path part, and configured to hold a liquid lubricant under pressure in said at least one pocket to create a relieving force acting on said carriage,
  wherein a space between said at least one pocket and said first guide path part is unsealed, to enable a flow of liquid lubricant through said space and out of said at least one pocket,
  wherein said at least one pocket is formed as a groove extending along the axis of travel from a first end to a second end, the second end being spaced away from the first end, the groove including a first wall and a second wall opposed to the first wall, with a continuous open space defined between the first wall and the second wall and extending along their entire length, each of the first and second ends being defined by a third wall arranged transversally to the first and second walls, the first and second walls ending at the third wall, and
wherein said second guide path part comprises an island-shaped surface which creates a frictional force acting on said carriage and is arranged in such a way that, when said liquid lubricant is held in said at least one pocket to create said relieving force, said first slideway relieves the load on said second slideway;
arranging either a workpiece, or a tool for machining the workpiece, on said displaceable carriage;
engaging said tool with said workpiece; and
moving said displaceable carriage so that said tool machines said workpiece.

* * * * *